(12) United States Patent
Na et al.

(10) Patent No.: US 9,767,450 B2
(45) Date of Patent: Sep. 19, 2017

(54) ANTENNA MODULE PACKAGE, ANTENNA MODULE PACKAGE CIRCUIT, BATTERY PACK INCLUDING THE SAME AND MOBILE DEVICE INCLUDING THE SAME

(71) Applicant: ITM SEMICONDUCTOR CO., LTD., Chungcheongbuk-do (KR)

(72) Inventors: Hyeok Hwi Na, Chungcheongbuk-do (KR); Ho Seok Hwang, Gyeonggi-do (KR); Young Seok Kim, Chungcheongbuk-do (KR); Seong Beom Park, Gyeonggi-do (KR); Sang Hoon Ahn, Chungcheongbuk-do (KR); Sun Ho Kim, Gyeonggi-do (KR)

(73) Assignee: ITM SEMICONDUCTOR CO., LTD., Chungcheongbuk-Do (KR)

( * ) Notice: Subject to any disclaimer, the term of this patent is extended or adjusted under 35 U.S.C. 154(b) by 0 days.

(21) Appl. No.: 15/008,506

(22) Filed: Jan. 28, 2016

(65) Prior Publication Data
US 2016/0224975 A1 Aug. 4, 2016

(30) Foreign Application Priority Data

Feb. 2, 2015 (KR) .......................... 10-2015-0016237

(51) Int. Cl.
*G06K 7/10* (2006.01)
*G06Q 20/34* (2012.01)
(Continued)

(52) U.S. Cl.
CPC ....... *G06Q 20/352* (2013.01); *G06K 7/10297* (2013.01); *G06K 7/10326* (2013.01);
(Continued)

(58) Field of Classification Search
USPC ..................................... 235/492; 705/39, 44
See application file for complete search history.

(56) References Cited

U.S. PATENT DOCUMENTS

| 2014/0040120 A1* | 2/2014 | Cho ................... G06Q 20/3278 705/39 |
| 2014/0279546 A1* | 9/2014 | Poole ................. G06Q 20/3278 705/44 |

(Continued)

FOREIGN PATENT DOCUMENTS

| KR | 1020060032669 A | 4/2006 |
| KR | 1020080029485 A | 4/2008 |
| KR | 1020140021694 A | 2/2014 |

*Primary Examiner* — Allyson Trail
(74) *Attorney, Agent, or Firm* — Mayer & Williams, PC; Stuart Mayer (57) ABSTRACT

Provided is an antenna module package including a substrate, a wireless card payment antenna structure mounted on the substrate and including a first antenna chip and wireless card payment matching elements electrically connected to the first antenna chip, a near field communication (NFC) antenna structure mounted on the substrate, sharing the first antenna chip, and including an extended NFC antenna loop and NFC matching elements electrically connected to the first antenna chip, and a wireless charging antenna structure mounted on the substrate and including a second antenna chip, and an extended wireless charging antenna loop and wireless charging matching elements electrically connected to the second antenna chip.

10 Claims, 4 Drawing Sheets

(51) Int. Cl.
  *H02J 7/02* (2016.01)
  *G06Q 20/32* (2012.01)
  *G07F 7/08* (2006.01)
  *G07F 7/10* (2006.01)
  *H02J 50/80* (2016.01)
  *H04B 5/00* (2006.01)
  *H02J 50/12* (2016.01)
  *H01Q 7/00* (2006.01)

(52) U.S. Cl.
  CPC ....... *G06Q 20/3278* (2013.01); *G07F 7/0806* (2013.01); *G07F 7/1008* (2013.01); *H02J 7/025* (2013.01); *H02J 50/12* (2016.02); *H02J 50/80* (2016.02); *H04B 5/0031* (2013.01); *H01Q 7/00* (2013.01)

(56) References Cited

U.S. PATENT DOCUMENTS

| | | | |
|---|---|---|---|
| 2015/0136858 A1* | 5/2015 | Finn | G06K 19/07754 235/492 |
| 2015/0180542 A1* | 6/2015 | Jang | H04B 5/0031 455/41.1 |
| 2016/0142866 A1* | 5/2016 | Jang | H04W 4/008 455/41.1 |
| 2016/0152340 A1* | 6/2016 | Bauer | B64D 11/0624 297/217.3 |
| 2016/0241306 A1* | 8/2016 | Moon | H01Q 1/2208 |
| 2016/0344710 A1* | 11/2016 | Khan | H04L 63/166 |

* cited by examiner

ANTENNA MODULE PACKAGE, ANTENNA MODULE PACKAGE CIRCUIT, BATTERY PACK INCLUDING THE SAME AND MOBILE DEVICE INCLUDING THE SAME

CROSS-REFERENCE TO RELATED PATENT APPLICATION

This application claims the benefit of Korean Patent Application No. 10-2015-0016237, filed on Feb. 2, 2015, in the Korean Intellectual Property Office, the disclosure of which is incorporated herein in its entirety by reference.

BACKGROUND

1. Field

The present invention relates to an antenna module package and an antenna module package circuit and, more particularly, to an antenna module package capable of improving antenna performance, an antenna module package circuit, a battery pack including the same, and a mobile device including the same.

2. Description of the Related Art

In the past, credit cards were dominantly used in offline markets and thus value added network (VAN) companies were developed. However, as online shopping is rapidly increased due to the development of the Internet, companies related to a payment gateway (PG) emerge in an online payment market. The online payment market of the PG rapidly grows based on the popularization of the Internet shopping market.

The currently widespread smartphones influence society, finance, and personal lifestyles beyond the simple development of communication devices, and greatly influence payment schemes. For example, mobile payment using smartphones is spread to micropayments and financial transactions as well as traffic charge payments.

As the spread of smartphones expands from the year 2010, mobile purchases, e.g., social commerce and digital contents, are increased. Furthermore, the mobile payment market rapidly grows by more than ten times for three years. However, a new type of mobile payment service is strongly needed due to problems such as privacy protection and security.

SUMMARY

The present invention provides an antenna module package capable of solving personal security problems and improving antenna performance, an antenna module package circuit, a battery pack including the same, and a mobile device including the same. However, the scope of the present invention is not limited thereto.

According to an aspect of the present invention, there is provided an antenna module package including a substrate, a wireless card payment antenna structure mounted on the substrate and including a first antenna chip and wireless card payment matching elements electrically connected to the first antenna chip, a near field communication (NFC) antenna structure mounted on the substrate, sharing the first antenna chip, and including an extended NFC antenna loop and NFC matching elements electrically connected to the first antenna chip, and a wireless charging antenna structure mounted on the substrate and including a second antenna chip, and an extended wireless charging antenna loop and wireless charging matching elements electrically connected to the second antenna chip.

The substrate may include a plurality of terminals, and the plurality of terminals may include antenna terminals where the first antenna chip is mounted, wireless card payment connection terminals electrically connectable to some of external connection terminals of a battery protection circuit package, or a main board, and usable to mount the wireless card payment matching elements thereon, and NFC connection terminals electrically connectable to some of the external connection terminals of the battery protection circuit package, or the main board, and usable to mount the NFC matching elements thereon.

The plurality of terminals may further include antenna terminals usable to mount the second antenna chip thereon, and wireless charging connection terminals electrically connectable to some of the external connection terminals of the battery protection circuit package, or the main board, and usable to mount the wireless charging matching elements thereon.

The antenna module package may further include an encapsulant for encapsulating the wireless card payment antenna structure, the NFC antenna structure, and the wireless charging antenna structure to expose at least parts of the wireless card payment connection terminals, the NFC connection terminals, and the wireless charging connection terminals.

The substrate may include a via pattern penetrating through the substrate, the wireless card payment matching elements may be electrically connectable to the first antenna chip and the wireless card payment connection terminals through the via pattern, and the NFC matching elements may be electrically connectable to the first antenna chip, the extended NFC antenna loop, and the NFC connection terminals through the via pattern.

The wireless charging matching elements may be electrically connectable to the second antenna chip, the extended wireless charging antenna loop, and the wireless charging connection terminals through the via pattern.

A length of the extended NFC antenna loop may be set in such a manner that a ratio of an inductance value generated by the extended NFC antenna loop to an inductance value generated by the first antenna chip is 13% or above.

The first antenna chip may be shared to ensure inductance in an NFC antenna frequency band different from a wireless card payment frequency band.

According to another aspect of the present invention, there is provided an antenna module package circuit including a first path including a first inductor and a first capacitor electrically connected to each other, and capable of performing a wireless card payment antenna function, a second path the first inductor, a second inductor, and a second capacitor electrically connected to each other, and capable of performing an NFC antenna function, and a third path a third inductor and a third capacitor electrically connected to each other, and capable of performing a wireless charging antenna function, wherein the first and second paths share the first inductor capable of performing at least one of or simultaneously performing the wireless card payment antenna function and the NFC antenna function.

An inductance value in a frequency band of the first path may be less than an inductance value in a frequency band of the second path, and the inductance value in the frequency band of the second path may be less than an inductance value in a frequency band of the third path.

According to another aspect of the present invention, there is provided a battery pack including a battery bare cell, a battery protection circuit element connected to the battery bare cell and including a protection integrated chip (IC), a field effect transistor (FET), and one or more passive elements, and an antenna module package electrically connected to the battery protection circuit element, wherein the antenna module package includes a substrate, a wireless card payment antenna structure mounted on the substrate and including a first antenna chip and wireless card payment matching elements electrically connected to the first antenna chip, a near field communication (NFC) antenna structure mounted on the substrate, sharing the first antenna chip, and including an extended NFC antenna loop and NFC matching elements electrically connected to the first antenna chip, and a wireless charging antenna structure mounted on the substrate and including a second antenna chip, and an extended wireless charging antenna loop and wireless charging matching elements electrically connected to the second antenna chip.

According to another aspect of the present invention, there is provided a mobile device including a main board, the above-described antenna module package electrically connected to the main board, and a controller mounted on the main board to additionally provided a security function for wireless card payment.

BRIEF DESCRIPTION OF THE DRAWINGS

The above and other features and advantages of the present invention will become more apparent by describing in detail embodiments thereof with reference to the attached drawings in which.

DETAILED DESCRIPTION

Reference will now be made in detail to embodiments, examples of which are illustrated in the accompanying drawings. However, embodiments are not limited to the embodiments illustrated hereinafter, and the embodiments herein are rather introduced to provide easy and complete understanding of the scope and spirit of embodiments. In the drawings, the thicknesses of layers and regions are exaggerated for clarity.

It will be understood that when an element, such as a layer, a region, or a substrate, is referred to as being "on," "connected to" or "coupled to" another element, it may be directly on, connected or coupled to the other element or intervening elements may be present. In contrast, when an element is referred to as being "directly on," "directly connected to" or "directly coupled to" another element or layer, there are no intervening elements or layers present. Like reference numerals refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of embodiments.

Spatially relative terms, such as "above," "upper," "beneath," "below," "lower," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "above" may encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of embodiments. As used herein, the singular forms "a," "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to schematic illustrations of idealized embodiments (and intermediate structures) of the invention. As such, variations from the shapes of the illustrations as a result, for example, of manufacturing techniques and/or tolerances, are to be expected. Thus, the embodiments of the invention should not be construed as limited to the particular shapes of regions illustrated herein, but are to include deviations in shapes that result, for example, from manufacturing.

Figure 1A:
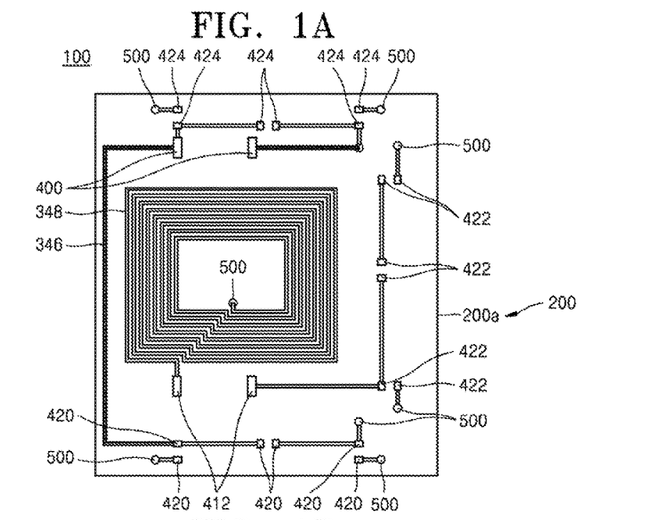
FIGS. 1A and 1B are top and bottom views of a sub-module for configuring an antenna module package, according to an embodiment of the present invention.
Figure 1B:
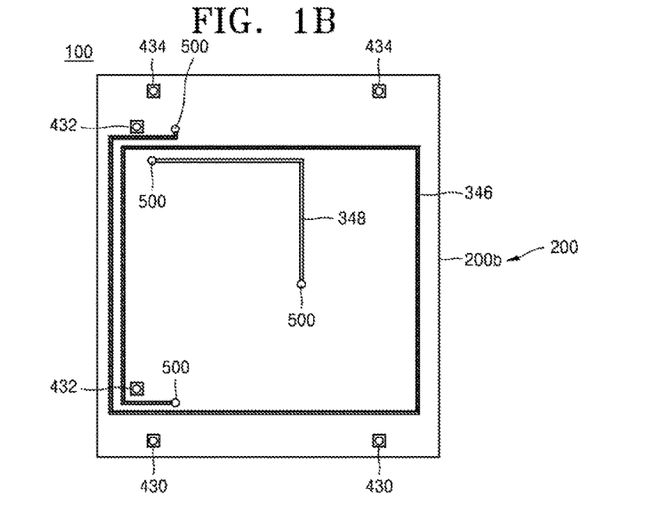
Figure 1C:
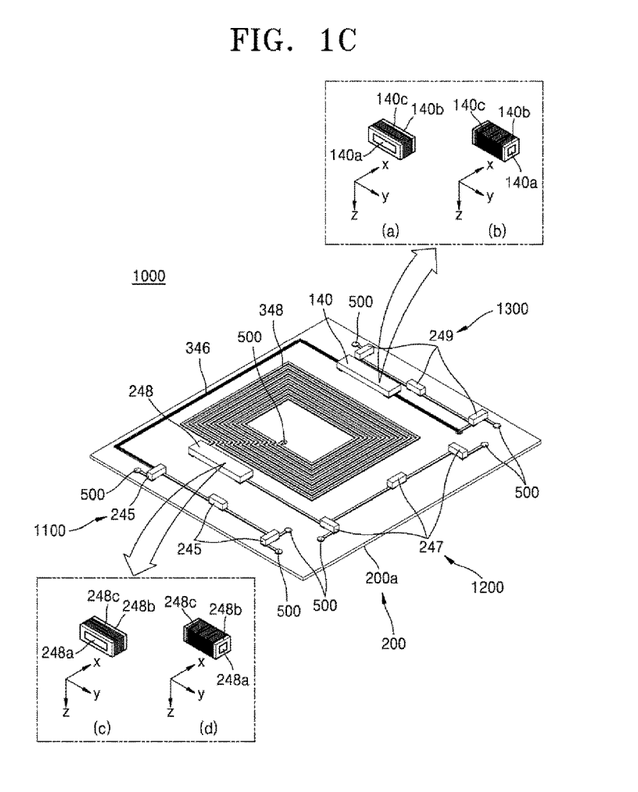
FIGS. 1C and 1D are top and bottom perspective views of an antenna module package according to an embodiment of the present invention.
Figure 1D:
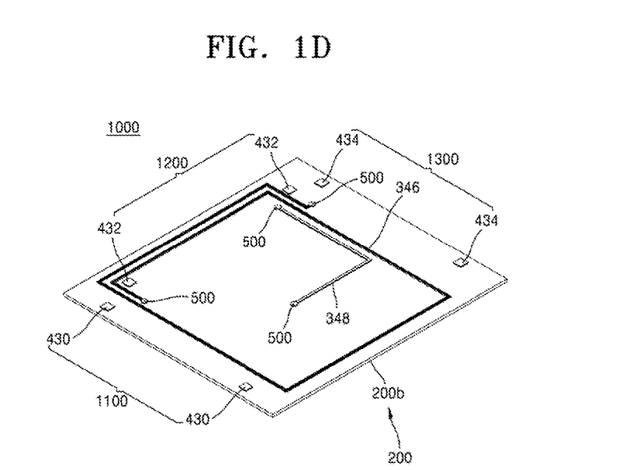

FIGS. 1A and 1B are top and bottom views of a sub-module 100 for configuring an antenna module package, according to an embodiment of the present invention, and FIGS. 1C and 1D are top and bottom perspective views of an antenna module package 1000 according to an embodiment of the present invention.

Referring to FIGS. 1A and 1B, the sub-module 100 according to an embodiment of the present invention may include a printed circuit board (PCB) as a substrate 200. A plurality of terminals may be provided on a top surface 200a and/or a bottom surface 200b of the substrate 200. For example, as illustrated in FIG. 1B, the sub-module 100 may include near field communication (NFC) connection terminals 430, wireless charging connection terminals 432, and wireless card payment connection terminals 434 on the bottom surface 200b of the substrate 200. The NFC connection terminals 430, the wireless charging connection terminals 432, and the wireless card payment connection terminals 434 may be provided as conductive pads and may be electrically connected to some of external connection terminals of a battery protection circuit package, or a main board. The some of the external connection terminals may include, for example, NFC and CF terminals.

In addition, the NFC connection terminals 430, the wireless charging connection terminals 432, and the wireless card payment connection terminals 434 may be directly connected to a main set. Herein, the main board may include a main board of an electronic device (e.g., a smartphone, mobile phone, smartpad, or tablet computer) electrically connected to a battery pack to receive power supplied from the battery pack or to supply power to the battery pack. In the following description, the main board may also be called a main set.

The sub-module 100 may further include one or more first antenna terminals 400 and one or more second antenna terminals 412 on the top surface 200a of the substrate 200. At least one first antenna chip 140 illustrated in FIG. 1C may be mounted on the first antenna terminals 400. Furthermore, at least one second antenna chip 248 may be mounted on the second antenna terminals 412. That is, the first and second antenna chips 140 and 248 may be mounted on at least parts of the surface of the substrate 200, e.g., the first antenna terminals 400 and the second antenna terminals 412, using surface mounting technology. The first and second antenna chips 140 and 248 may be electrically connected to a plurality of matching elements using conductive line patterns. In addition, the first antenna chip 140 may be shared to ensure inductance in an NFC antenna frequency band different from a wireless card payment frequency band. The second antenna chip 248 may be configured separately from the first antenna chip 140 to ensure inductance in a wireless charging frequency band.

The sub-module 100 may further include wireless card payment matching element connection terminals 424 provided between and electrically connected to the first antenna terminals 400 and the wireless card payment connection terminals 434 among the plurality of terminals of the substrate 200. A plurality of wireless card payment matching elements 249 may be mounted on the wireless card payment matching element connection terminals 424 using surface mounting technology. The wireless card payment matching elements 249 may include one or more capacitors.

Furthermore, the sub-module 100 may further include NFC matching element connection terminals 420 provided between and electrically connected to the first antenna terminals 400 and the NFC connection terminals 430 among the plurality of terminals of the substrate 200. A plurality of NFC matching elements 245 may be mounted on the NFC matching element connection terminals 420 using surface mounting technology. The NFC matching elements 245 may include one or more capacitors.

In addition, the sub-module 100 may further include wireless charging matching element connection terminals 422 provided between and electrically connected to the second antenna terminals 412 and the wireless charging connection terminals 432 among the plurality of terminals of the substrate 200. A plurality of wireless charging matching elements 247 may be mounted on the wireless charging matching element connection terminals 422 using surface mounting technology. The wireless charging matching elements 247 may include one or more capacitors.

Referring to FIGS. 1C and 1D, the antenna module package 1000 according to an embodiment of the present invention may include a plurality of matching elements 245, 247, and 249, an extended NFC antenna loop 346, and an extended wireless charging antenna loop 348 provided on a surface of the substrate 200 used to mount the first antenna chip 140 thereon, i.e., the top surface 200a of the substrate 200.

For example, the antenna module package 1000 may include the first antenna chip 140 mounted on the top surface 200a of the substrate 200 and capable of resonating in a wireless card payment frequency band to perform a wireless card payment antenna function, and the wireless card payment matching elements 249 electrically connected to the first antenna chip 140. Herein, the wireless card payment frequency band is a frequency band used for mobile payment and refers to a frequency band capable of wirelessly transmitting and receiving information of a debit card or a credit card to and from an application of a smartphone and an external device connected to the smartphone.

The first antenna chip 140 may be mounted on the first antenna terminals 400 illustrated in FIG. 1A and at least a part of the substrate 200 using surface mounting technology. Two ends of the first antenna chip 140 may be electrically connected to the wireless card payment matching elements 249 using a conductive line pattern. Furthermore, the first antenna chip 140 and the wireless card payment matching elements 249 may be electrically connected to the wireless card payment connection terminals 434 using a via pattern 500 penetrating through the substrate 200 and thus may resonate in the wireless card payment frequency band. In the wireless card payment antenna function, a driver integrated chip (IC) or a controller included in a main body such as a smartphone may control a security function. Herein, the wireless card payment antenna function refers to a magnetic secure transmission technology for transmitting information of a debit card or a credit card using resonance in a frequency band for mobile payment and, more particularly, in a frequency band capable of wirelessly transmitting and receiving information of a debit card or a credit card to and from an application of a smartphone and an external device connected to the smartphone.

The antenna module package 1000 may include the extended NFC antenna loop 346 provided on a surface of the substrate 200 used to mount the first antenna chip 140 thereon, i.e., the top surface 200a of the substrate 200, to perform an NFC antenna function in addition to the above-described wireless card payment antenna function. The antenna module package 1000 may further include the NFC matching elements 245. Accordingly, one end of the extended NFC antenna loop 346 may be electrically connected to the first antenna chip 140, the NFC matching elements 245, and the NFC connection terminals 430 using a conductive line pattern and a via pattern 500 penetrating through the substrate 200. Herein, the structure or technology of the via pattern 500 is well known and thus a detailed description thereof is omitted.

That is, referring to FIG. 1C, the first antenna chip 140 may be shared by an NFC antenna structure 1100 including the extended NFC antenna loop 346 and the NFC matching elements 245 to perform the NFC antenna function, and a wireless card payment antenna structure 1300 including the wireless card payment matching elements 249 to perform the wireless card payment antenna function.

One end of the first antenna chip 140 may be electrically connected to the extended NFC antenna loop 346, and another end of the first antenna chip 140 may be electrically connected to the NFC matching elements 245. One end of the NFC matching elements 245 may be electrically connected to the extended NFC antenna loop 346. The extended NFC antenna loop 346 may be provided near the outermost part of the top surface 200a of the substrate 200 or on a part of the substrate 200 to be bent at least one time. The first antenna chip 140, the NFC matching elements 245, the extended NFC antenna loop 346, and the NFC connection terminals 430 may be electrically connected to each other using two or more via patterns 500 penetrating through the substrate 200.

Furthermore, the antenna module package 1000 may perform a wireless charging antenna function in addition to the above-described functions. The extended wireless charging antenna loop 348 may be provided on a surface of the substrate 200 used to mount the second antenna chip 248b thereon separately from the first antenna chip 140, i.e., the top surface 200a of the substrate 200. The antenna module package 1000 may further include the wireless charging matching elements 247. Accordingly, one end of the extended wireless charging antenna loop 348 may be electrically connected to the second antenna chip 248, the wireless charging matching elements 247, and the wireless charging connection terminals 432 using a conductive line pattern and a via pattern 500 penetrating through the substrate 200.

That is, referring to FIG. 1C, the first antenna chip 140 may be shared by the NFC antenna structure 1100 including the extended NFC antenna loop 346 and the NFC matching elements 245, and the wireless card payment antenna structure 1300 including the wireless card payment matching elements 249.

One end of the first antenna chip 140 may be electrically connected to the extended NFC antenna loop 346, and another end of the first antenna chip 140 may be electrically connected to the NFC matching elements 245. The extended NFC antenna loop 346 may be provided on the top surface 200a of the substrate 200 or on a part of the substrate 200 to be bent at least one time. The first antenna chip 140, the extended NFC antenna loop 346, and the NFC connection terminals 430 may be electrically connected to each other using two or more via patterns 500 penetrating through the substrate 200.

In addition, the extended NFC antenna loop 346 and the extended wireless charging antenna loop 348 may be provided by winding conductive line patterns multiple times around the center of the top surface 200a of the substrate 200 (about an axis perpendicular to the surface 200a) counterclockwise.

Although not shown in FIGS. 1A to 1D, the extended NFC antenna loop 346 and the extended wireless charging antenna loop 348 may be provided on a surface of the substrate 200 not used to mount the first and second antenna chips 140 and 248 thereon.

That is, a plurality of lines may be wound in a counter-clockwise direction about an axis perpendicular to the substrate 200, and the extended wireless charging antenna loop 348 may be produced using a via pattern 500 provided in the substrate 200. The extended NFC antenna loop 346 may form a loop surrounding the outermost part of the extended wireless charging antenna loop 348, and may be electrically connected to other parts using via patterns 500 other than the via pattern 500 connected to the extended wireless charging antenna loop 348. Herein, a loop has an arbitrary shape capable of generating inductance. In addition, the loop is not limited to a closed loop.

Figure 3:
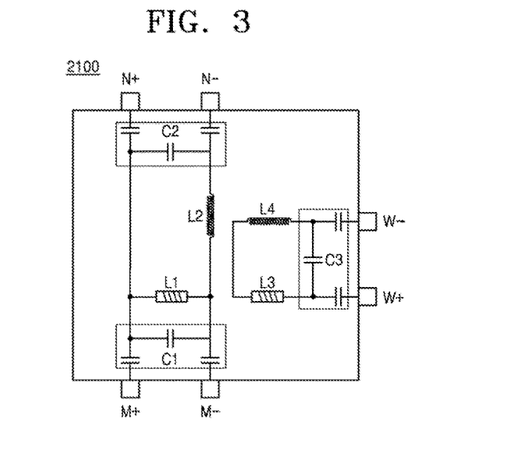
FIG. 3 is a circuit diagram of an antenna module package circuit according to an embodiment of the present invention.

The length of the extended NFC antenna loop 346 may be set in such a manner that a ratio of an inductance value generated by the extended NFC antenna loop 346 to an inductance value generated by the first antenna chip 140 illustrated in FIG. 3 is 13% or above.

The conductive line pattern illustrated in FIG. 1A, i.e., the extended NFC antenna loop 346, has a shape capable of generating inductance, e.g., at least a part of the shape of a loop capable of generating inductance. Inductance refers to an amount indicating a ratio of a counter electromotive force generated due to induction of an electromotive force based on a variation in current flowing through a circuit, and a measurement unit for inductance is H (henry).

The present inventors discovered that, to allow the extended NFC antenna loop 346 configured as a conductive pattern to serve as an auxiliary antenna, an inductance value generated by the extended NFC antenna loop 346 should be equal to or greater than a predetermined ratio compared to an inductance value generated by the first antenna chip 140.

Table 1 shows a result of testing whether the extended NFC antenna loop 346 functions as an auxiliary NFC antenna, based on an inductance value generated by the extended NFC antenna loop 346 when an inductance value generated by the first antenna chip 140 is 0.56 μH.

TABLE 1

| Experimental Examples | Inductance of Extended Antenna (μH) | Length of Extended Antenna (mm) | Inductance Ratio | Capability to Function as Auxiliary NFC Antenna |
|---|---|---|---|---|
| Experimental Example 1 | 0.04 | 34 | 6% | x |
| Experimental Example 2 | 0.05 | 37 | 8% | x |
| Experimental Example 3 | 0.07 | 43 | 11% | x |
| Experimental Example 4 | 0.08 | 47 | 13% | ○ |
| Experimental Example 5 | 0.09 | 50 | 14% | ○ |

Referring to Experimental Example 1, when the length of the extended NFC antenna loop 346 forming a loop is 34 mm, the inductance value generated by the extended NFC antenna loop 346 is 0.04 μH but the extended NFC antenna loop 346 does not function as an auxiliary NFC antenna. That is, when the inductance value generated by the extended NFC antenna loop 346 is only 6% of the inductance value generated by the first antenna chip 140, although the extended NFC antenna loop 346 configured as an extended antenna is employed, an NFC readable distance is not increased.

On the contrary, referring to Experimental Example 4, when the length of the extended NFC antenna loop 346 forming a loop is 47 mm, the inductance value generated by the extended NFC antenna loop 346 is 0.08 μH and the extended NFC antenna loop 346 functions as an auxiliary NFC antenna. That is, when the inductance value generated by the extended NFC antenna loop 346 reaches 13% of the inductance value generated by the first antenna chip 140, an NFC readable distance is increased due to the extended NFC antenna loop 346 configured as an extended antenna.

As shown in Experimental Examples 1 to 5, by ensuring a predetermined or longer length of the extended NFC antenna loop 346 configured as an extended antenna, when the ratio of the inductance value generated by the extended NFC antenna loop 346 to the inductance value generated by the first antenna chip 140 is equal to or greater than a predetermined ratio (e.g., 13%), an NFC readable distance is increased due to the extended NFC antenna loop 346 configured as an extended antenna.

As described above in relation to Table 1, by securing a predetermined or longer length of an extended antenna, when the ratio of the inductance value generated by the extended NFC antenna loop 346 to the inductance value generated by the first antenna chip 140 is equal to or greater than a predetermined ratio (e.g., 13%), an NFC readable distance is increased due to the extended antenna.

In addition, for example, an NFC communication frequency band of 13.56 MHz may be generated using resonance generated by the first antenna chip 140 and the capacitors serving as the NFC matching elements 245, to communicate with an NFC device.

The first antenna chip 140 corresponds to an inductor. Although not shown in FIGS. 1A to 1D, an NFC control IC and a second capacitor may be embedded in the antenna module package 1000. Furthermore, the antenna module package 1000 may be embedded in a universal subscriber identity module (USIM) chip to achieve a single-chip configuration.

In addition, the first antenna chip 140 may support, for example, near field communication (NFC). The first antenna chip 140 may include an inductor capable of resonating in an NFC frequency band, and may have one of various wire-winding structures. For example, the first antenna chip 140 may have a form of a chip as illustrated in (a) and (b) of FIG. 1C. The first antenna chip 140 may include an inductor capable of resonating in an NFC frequency band.

Furthermore, the first antenna chip 140 according to an embodiment of the present invention may further include at least one selected from the group consisting of a first capacitor, a second capacitor, and an NFC control IC.

In an NFC antenna according to a comparative example of the present invention, when a battery pack is assembled, a film-shaped NFC antenna is provided and bonded using soldering. However, the antenna soldering process may be omitted by employing the first antenna chip 140 according to an embodiment of the present invention, and an overall shearing strength may be improved by mounting and encapsulating the first antenna chip 140 in the form of a chip.

Referring to (a) and (b) of FIG. 1C, the first antenna chip 140 including an inductor capable of resonating in a certain frequency band may have one of various wire-winding structures. For example, wire-winding structures available when the certain frequency band is an NFC frequency band are as described below.

First, a wire-winding structure illustrated in (a) of FIG. 1C includes a coil having a first winding direction. For example, the above wire-winding structure includes a core 140a formed of nickel ferrite, and a coil 140c having a first winding direction parallel to the x direction and the z direction to surround a bobbin 140b. In this case, NFC communication may be implemented when the direction of an induced magnetic field generated in association with an NFC reader is parallel to the y direction.

Second, a plurality of the first antenna chips 140 each including a wire-winding structure illustrated in (b) of FIG. 1C may be provided to be spaced apart from each other. If an NFC antenna has a form of a chip, a plurality of chips each including the NFC antenna may be provided. A description of the wire-winding structure equals the description given above in relation to the first example. That is, the first antenna chips 140 may include coils 140c having the same first winding direction as illustrated in (a) of FIG. 1C. According to a modified embodiment, if an NFC antenna has a form of a chip, a single chip including the NFC antenna may be provided and a plurality of the wire-winding structures illustrated in (a) of FIG. 1C may be included in the single chip. In this case, compared to the first antenna chip 140 of the first example, the sensitivity of NFC communication may be improved.

Third, a plurality of the first antenna chips 140 spaced apart from each other may be provided. Some of the first antenna chips 140 may include coils 140c having a first winding direction as illustrated in (a) of FIG. 1C, and the others of the first antenna chips 140 may include coils 140c having a second winding direction perpendicular to the first winding direction as illustrated in (b) of FIG. 1C. For example, a wire-winding structure having the first winding direction includes a core 140a formed of nickel ferrite, and a coil 140c wound in a direction parallel to the x direction and the z direction to surround a bobbin 140b, and a wire-winding structure having the second winding direction includes a core 140a formed of nickel ferrite, and a coil 140c wound in a direction parallel to the y direction and the z direction to surround a bobbin 140b.

If an NFC antenna has a form of a chip, the NFC antenna may include both a chip-type first antenna structure having the wire-winding structure of the first winding direction, and a chip-type second antenna structure having the wire-winding structure of the second winding direction. Alternatively, the NFC antenna may include both the wire-winding structure including the coil 140c having the first winding direction and the wire-winding structure including the coil 140c having the second winding direction in a single chip including the first antenna chip 140. In this case, NFC communication may be implemented even when different wire-winding structures are not provided in parallel to each other but form an arbitrary angle therebetween, and the sensitivity of NFC communication may be improved.

The wire-winding structure of the first antenna chip 140 has been described above as, for example, a coiling structure for winding a coil around a core. However, the first antenna chip 140 according to the technical idea of the present invention is not limited to the above coiling structure and may also be implemented by, for example, patterning a conductive material.

On the contrary, the extended wireless charging antenna loop 348 illustrated in FIG. 1C may be implemented as a loop-type conductive line pattern. If two ends of the extended wireless charging antenna loop 348 contact the wireless charging connection terminals 432, the capacitors serving as the wireless charging matching elements 247 may be electrically connected thereto to form a closed loop. For example, a wireless charging frequency band of 125 kHz may be generated using resonance generated by the first antenna chip 140 and the capacitors serving as the wireless charging matching elements 247, to communicate with a wireless charging device.

Referring to (c) and (d) of FIG. 1C, the second antenna chip 248 including an inductor capable of resonating in a certain frequency band may have one of various wire-winding structures. The second antenna chip 248 has the same structure as the first antenna chip 140 described above in relation to (a) and (b) of FIG. 1C, and thus a detailed description thereof is omitted herein.

For example, a wireless card payment frequency band of about 250 kHz may be generated using resonance generated by the second antenna chip 248 and the capacitors serving as the wireless card payment matching elements 249, to communicate with a mobile payment system. Herein, the frequency band of about 250 kHz may be changed depending on wireless transmission/reception frequency bands allowed to be used in Korea or other countries.

In addition, the antenna module package 1000 may secure inductance by connecting an additional inductor or chip as well as the extended NFC antenna loop 346 and the extended wireless charging antenna loop 348.

Shortly, the antenna module package 1000 may include the wireless card payment antenna structure 1300 mounted on the substrate 200 and including the first antenna chip 140 and the wireless card payment matching elements 249 electrically connected to the first antenna chip 140, and the NFC antenna structure 1100 mounted on the substrate 200, sharing the first antenna chip 140, and including the extended NFC antenna loop 346 and the NFC matching elements 245 electrically connected to the first antenna chip 140. Furthermore, the antenna module package 1000 may include a wireless charging antenna structure 1200 including the extended wireless charging antenna loop 348 and the wireless charging matching elements 247 electrically connected to the second antenna chip 248.

Figure 2A:
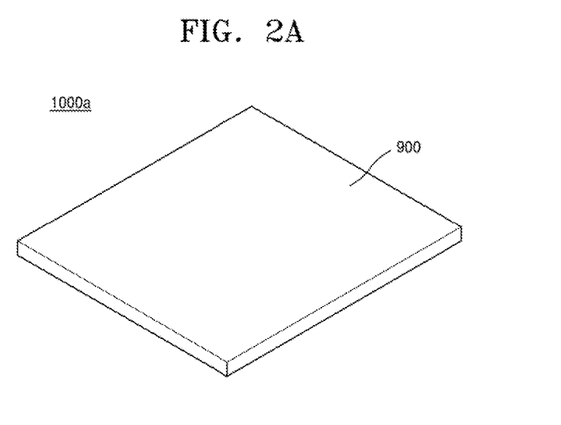
FIGS. 2A and 2B are top and bottom perspective views of the antenna module package illustrated in FIGS. 1C and 1D and encapsulated with an encapsulant.
Figure 2B:
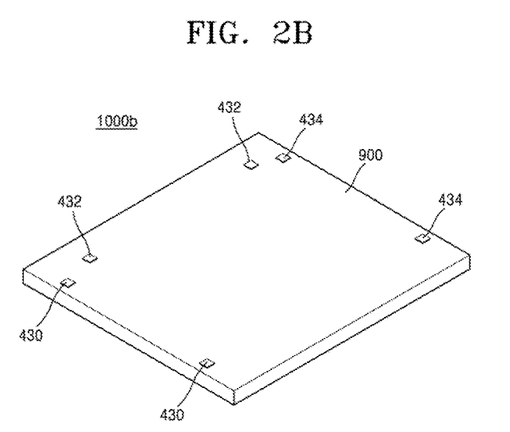

FIGS. 2A and 2B are top and bottom perspective views of the antenna module package 1000 illustrated in FIGS. 1C and 1D and encapsulated with an encapsulant 900.

Referring to FIGS. 2A and 2B, at least a part of the above-described antenna module package 1000 may be encapsulated with the encapsulant 900 to protect the antenna module package 1000. For example, the whole surface of the antenna module package 1000 illustrated in FIGS. 1C and 1D may be encapsulated with the encapsulant 900. That is, the first antenna chip 140, the NFC matching elements 245, the extended NFC antenna loop 346, the second antenna chip 248, the wireless charging matching elements 247, the extended wireless charging antenna loop 348, and the wireless card payment matching elements 249 provided on the top surface 200a of the substrate 200 may be encapsulated with the encapsulant 900. Meanwhile, while the whole surface of the antenna module package 1000 is encapsulated with the encapsulant 900, the encapsulation may be such that the connection terminals 430, 432 and 434 are exposed to the outside to be connected with the battery protection circuit package.

Referring to FIG. 2B, a rear surface 1000b of the antenna module package 1000 may be encapsulated to expose at least parts of the NFC connection terminals 430, the wireless charging connection terminals 432, and the wireless card payment connection terminals 434. Surfaces of the NFC connection terminals 430, the wireless charging connection terminals 432, and the wireless card payment connection terminals 434 may be exposed to directly contact and electrically connected to some of external connection terminals of a battery protection circuit package, or a main set.

FIG. 3 is a circuit diagram of an antenna module package circuit 2100 according to an embodiment of the present invention.

Referring to FIG. 3, the antenna module package circuit 2100 according to an embodiment of the present invention may include a first path including a first inductor L1 and a first capacitor C1 electrically connected to each other, and capable of performing a wireless card payment antenna function. Furthermore, the antenna module package circuit 2100 may include a second path sharing the first inductor L1, including the first inductor L1, a second inductor L2, and a second capacitor C2 electrically connected to each other, and capable of performing an NFC antenna function. Additionally, the antenna module package circuit 2100 may include a third path including a third inductor L3, a fourth inductor L4, and a third capacitor C3 electrically connected to each other, and capable of performing a wireless charging antenna function.

The first inductor L1 may perform at least one of the wireless card payment antenna function and the NFC antenna function, or simultaneously perform the two antenna functions. Furthermore, each of the first and second capacitors C1 and C2 may include one or more capacitors.

Specifically, two ends of the first path capable of performing the wireless card payment antenna function serve as wireless card payment connection terminals M+ and M− connectable to external connection terminals of a battery protection circuit package, or a main set. The wireless card payment connection terminals M+ and M−, the first inductor L1, and the first capacitor C1 may be electrically connected to each other to secure inductance used to perform a magnetic secure connection function.

In addition, two ends of the second path capable of performing the NFC antenna function serve as NFC connection terminals N+ and N− connectable to external connection terminals of a battery protection circuit package, or a main set. The NFC connection terminals N+ and N−, the first inductor L1, the second inductor L2, and the second capacitor C2 may be electrically connected to each other to secure inductance used to perform the NFC antenna function.

Lastly, two ends of the third path capable of performing the wireless charging antenna function serve as wireless charging connection terminals W+ and W− connectable to external connection terminals of a battery protection circuit package, or a main set. The third inductor L3 and the third capacitor C3 electrically connected to the wireless charging connection terminals W+ and W− may be used to perform the wireless charging antenna function. Alternatively, the wireless charging connection terminals W+ and W−, the third inductor L3, the fourth inductor L4, and the third capacitor C3 may be electrically connected to each other to secure inductance used to perform the wireless charging antenna function. The third capacitor C3 may include one or more capacitors.

Herein, an inductor may be understood as an element for storing or emitting magnetic energy, and a capacitor may be understood as an element for storing or emitting electric energy. In the antenna module package circuit 2100, a different value is obtained depending on a connection structure (serial connection or parallel connection) of the inductor and the capacitor.

The inductor and the capacitor have opposite frequency characteristics. If the inductor and the capacitor are connected in series to each other, when the same impedance is obtained in a specific frequency (resonance frequency) band, pushing and pulling forces thereof equilibrate. That is, when impedance has the minimum value, an applied signal (current) has the maximum value and resonance occurs in a specific frequency band.

Otherwise, if the inductor and the capacitor are connected in parallel to each other, when impedance has the maximum value, an applied signal (current) has the minimum value and a specific frequency band is blocked.

In the antenna module package circuit 2100, when inductance values of inductors of different communication bands are compared, the largest inductance value is obtained in a wireless charging frequency band, the second largest inductance value is obtained in an NFC frequency band, and the smallest inductance value is obtained in a wireless card payment frequency band. Accordingly, the circuit configuration based on the inductance value of each antenna per communication band may be expressed as given by Equations 1 to 3.

$$L_{MST} = L_1 \quad \text{[Equation 1]}$$

(where $L_{MST}$ denotes an inductance value of an inductor corresponding to a wireless card payment frequency band, and $L_1$ denotes an inductance value of a first inductor.)

$$L_{NFC} = L_1 + L_2 \quad \text{[Equation 2]}$$

(where $L_{NFC}$ denotes an inductance value of an inductor corresponding to an NFC frequency band, $L_1$ denotes an inductance value of a first inductor, and $L_2$ denotes an inductance value of a second inductor.)

$$L_{WPC}=L_3+L_4 \quad \text{[Equation 3]}$$

(where $L_{WPC}$ denotes an inductance value of an inductor corresponding to a wireless charging frequency band, $L_3$ denotes an inductance value of a third inductor, and $L_4$ denotes an inductance value of a fourth inductor.)

Accordingly, a plurality of inductors may be connected in series to at least any one inductor and thus the inductance value of inductors per communication band may be increased. Alternatively, a plurality of inductors may be connected in parallel to at least any one inductor and thus the inductance value of inductors per communication band may be reduced.

That is, since the inductance value in the frequency band of the first path is less than the inductance value in the frequency band of the second path and the inductance value in the frequency band of the second path is less than the inductance value in the frequency band of the third path, compared to the wireless card payment antenna, the NFC antenna may be configured as a circuit including a larger number of inductors connected in serial to each other. Furthermore, compared to the NFC antenna, the wireless charging antenna may be configured as a circuit including a larger number of inductors connected in serial to each other. Herein, the inductor may be implemented using one of various elements such as a printed circuit board (PCB), a flexible printed circuit board (FPCB), or a coil.

The present invention also provides a battery pack. Herein, although not shown in any drawing, the battery pack may include a battery bare cell. Furthermore, the battery pack may include a battery protection circuit element connected to the battery bare cell and including a protection IC, a field effect transistor (FET), and one or more passive elements, and the antenna module package 1000 electrically connected to the battery protection circuit element.

As described above in relation to FIGS. 1C and 1D, the antenna module package 1000 may include the wireless card payment antenna structure 1300 mounted on the substrate 200 and including the first antenna chip 140 and the wireless card payment matching elements 249 electrically connected to the first antenna chip 140. Furthermore, the antenna module package 1000 may include the NFC antenna structure 1100 mounted on the substrate 200, sharing the first antenna chip 140, and including the extended NFC antenna loop 346 and the NFC matching elements 245 electrically connected to the first antenna chip 140, and the wireless charging antenna structure 1200 mounted on the substrate 200 and including the second antenna chip 248, and the extended wireless charging antenna loop 348 and the wireless charging matching elements 247 electrically connected to the second antenna chip 248.

The present invention also provides a mobile device. Herein, although not shown in any drawing, the mobile device may include a main board, the antenna module package 1000 electrically connected to the main board and described above in relation to FIGS. 1A to 1D, and a controller mounted on the main board to additionally provide a security function for wireless card payment. Herein, the antenna module package 1000 may be included in a battery pack to receive power supplied therefrom. Alternatively, the antenna module package 1000 may be included in an element other than the battery pack. The main board may be a main board of the mobile device, and the controller may be provided on the main board in the form of a chip to perform the security function or to control various antenna functions.

According to a conventional technology, an NFC antenna and a wireless charging antenna are used as radio frequency (RF) antennas and thus mounting positions thereof are very restrictive due to large sizes thereof. In addition, if a battery pack is manufactured by employing a metal body, antenna performance is degraded. Furthermore, if an antenna chip is used, a recognition range or distance is restricted due to a small size thereof and thus antenna performance is degraded.

To solve the above problems, an antenna module package according to an embodiment of the present invention may achieve a high integration and a small size, and may provide freedom to select antenna locations. Furthermore, an antenna array using a plurality of antenna chips or a combination of the antenna array and extended antenna loops may increase an antenna recognition range or distance, and thus the antenna module package may improve antenna performance.

Besides, the antenna module package may further include a wireless card payment antenna structure in addition to an NFC antenna structure and a wireless charging antenna structure and may be embedded in a single chip. Accordingly, the NFC antenna structure may share a first antenna chip included in the wireless card payment antenna structure and thus an area for transmission and reception of the antenna module package may be minimized. Furthermore, inductance values corresponding to other frequency bands may be ensured and thus various antenna functions may be performed in multiple frequency bands using inductors.

In addition, a battery pack according to an embodiment of the present invention may include a battery bare cell, a battery protection circuit element electrically connected to the battery bare cell and including a protection IC, an FET, and one or more passive elements, and the antenna module package 1000 described above in relation to FIGS. 1A to 1D. A mobile device according to an embodiment of the present invention may include an antenna module package not included in a battery pack but configured separately, and electrically connected to a main board of a mobile device, and a controller capable of additionally providing a security function for wireless card payment.

As described above, according to an embodiment of the present invention, an antenna module package including a wireless card payment antenna, an NFC antenna, and a wireless charging antenna, and capable of achieving a high integration and a small size, solving personal security problems, and improving antenna performance, an antenna module package circuit, a battery pack including the same, and a mobile device including the same may be implemented. However, the scope of the present invention is not limited to the above effects.

While the present invention has been particularly shown and described with reference to embodiments thereof, it will be understood by those of ordinary skill in the art that various changes in form and details may be made therein without departing from the spirit and scope of the present invention as defined by the following claims.

What is claimed is:
1. An antenna module package comprising:
a substrate;
a wireless card payment antenna structure mounted on the substrate and comprising a first antenna chip and wireless card payment matching elements electrically connected to the first antenna chip;

a near field communication (NFC) antenna structure mounted on the substrate, sharing the first antenna chip, and comprising an extended NFC antenna loop and NFC matching elements electrically connected to the first antenna chip; and a wireless charging antenna structure mounted on the substrate and comprising a second antenna chip, and an extended wireless charging antenna loop and wireless charging matching elements electrically connected to the second antenna chip, wherein the substrate comprises a plurality of terminals, and wherein the plurality of terminals comprise:

antenna terminals where the first antenna chip is mounted;

wireless card payment connection terminals electrically connectable to some of external connection terminals of a battery protection circuit package, or a main board, and usable to mount the wireless card payment matching elements thereon; and NFC connection terminals electrically connectable to some of the external connection terminals of the battery protection circuit package, or the main board, and usable to mount the NFC matching elements thereon.

2. The antenna module package of claim 1,
wherein the plurality of terminals further comprise:
antenna terminals usable to mount the second antenna chip thereon; and
wireless charging connection terminals electrically connectable to some of the external connection terminals of the battery protection circuit package, or the main board, and usable to mount the wireless charging matching elements thereon.

3. The antenna module package of claim 2, further comprising:
an encapsulant for encapsulating the wireless card payment antenna structure, the NFC antenna structure, and the wireless charging antenna structure to expose at least parts of the wireless card payment connection terminals, the NFC connection terminals, and the wireless charging connection terminals.

4. The antenna module package of claim 2,
wherein the substrate comprises a via pattern penetrating through the substrate,
wherein the wireless card payment matching elements are electrically connectable to the first antenna chip and the wireless card payment connection terminals through the via pattern, and
wherein the NFC matching elements are electrically connectable to the first antenna chip, the extended NFC antenna loop, and the NFC connection terminals through the via pattern.

5. The antenna module package of claim 4,
wherein the wireless charging matching elements are electrically connectable to the second antenna chip, the extended wireless charging antenna loop, and the wireless charging connection terminals through the via pattern.

6. The antenna module package of claim 1,
wherein a length of the extended NFC antenna loop is set in such a manner that a ratio of an inductance value generated by the extended NFC antenna loop to an inductance value generated by the first antenna chip is 13% or above.

7. The antenna module package of claim 1,
wherein the first antenna chip is shared to ensure inductance in an NFC antenna frequency band different from a wireless card payment frequency band.

8. A mobile device comprising:
a main board;
the antenna module package of claim 1, which is electrically connected to the main board; and
a controller mounted on the main board to additionally provided a security function for wireless card payment.

9. An antenna module package circuit comprising:
a first path comprising a first inductor and a first capacitor electrically connected to each other, and capable of performing a wireless card payment antenna function;
a second path the first inductor, a second inductor, and a second capacitor electrically connected to each other, and capable of performing an NFC antenna function; and
a third path a third inductor and a third capacitor electrically connected to each other, and capable of performing a wireless charging antenna function,
wherein the first and second paths share the first inductor capable of performing at least one of or simultaneously performing the wireless card payment antenna function and the NFC antenna function,
wherein an inductance value in a frequency band of the first path is less than an inductance value in a frequency band of the second path, and
wherein the inductance value in the frequency band of the second path is less than an inductance value in a frequency band of the third path.

10. A battery pack comprising:
a battery bare cell;
a battery protection circuit element connected to the battery bare cell and comprising a protection integrated chip (IC), a field effect transistor (FET), and one or more passive elements; and
an antenna module package electrically connected to the battery protection circuit element,
wherein the antenna module package comprises:
a substrate;
a wireless card payment antenna structure mounted on the substrate and comprising a first antenna chip and wireless card payment matching elements electrically connected to the first antenna chip;
a near field communication (NFC) antenna structure mounted on the substrate, sharing the first antenna chip, and comprising an extended NFC antenna loop and NFC matching elements electrically connected to the first antenna chip; and
a wireless charging antenna structure mounted on the substrate and comprising a second antenna chip, and an extended wireless charging antenna loop and wireless charging matching elements electrically connected to the second antenna chip.

* * * * *